US 6,644,225 B2

(12) United States Patent
Keaton

(10) Patent No.: US 6,644,225 B2
(45) Date of Patent: Nov. 11, 2003

(54) ELECTRONICALLY CONTROLLED TUNING ORIFICE FOR SEED METER TUNING

(75) Inventor: Miles R. Keaton, Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/051,904

(22) Filed: Jan. 17, 2002

(65) Prior Publication Data
US 2003/0131769 A1 Jul. 17, 2003

(51) Int. Cl.[7] .................................................. A01C 7/00
(52) U.S. Cl. ........................................................ 111/175
(58) Field of Search .......................... 111/34, 170, 174, 111/175, 176, 177, 183, 184, 185, 200, 903, 904

(56) References Cited

U.S. PATENT DOCUMENTS

| 3,972,121 | A | | 8/1976 | Nash | |
|---|---|---|---|---|---|
| 4,118,173 | A | | 10/1978 | Shakiba | |
| 4,664,290 | A | | 5/1987 | Martin et al. | |
| 4,793,511 | A | | 12/1988 | Ankum et al. | |
| 4,872,785 | A | | 10/1989 | Schrage et al. | |
| 4,915,258 | A | | 4/1990 | Olson | |
| 5,074,228 | A | * | 12/1991 | Daws | 111/175 |
| 5,097,814 | A | | 3/1992 | Smith | |
| 5,170,909 | A | | 12/1992 | Lundie et al. | |
| 5,265,547 | A | * | 11/1993 | Daws | 111/175 |
| 5,515,795 | A | | 5/1996 | Ledermann et al. | |
| 5,575,225 | A | | 11/1996 | Smith et al. | |
| 5,592,974 | A | | 1/1997 | Grobs et al. | |
| 5,740,746 | A | * | 4/1998 | Ledermann et al. | 111/174 |
| 5,938,071 | A | * | 8/1999 | Sauder | 221/211 |
| 5,979,343 | A | * | 11/1999 | Gregor et al. | 111/175 |
| 5,996,516 | A | * | 12/1999 | Benneweis et al. | 111/176 |
| 6,024,129 | A | | 2/2000 | Schima | |
| 6,047,652 | A | * | 4/2000 | Prairie et al. | 111/174 |
| 6,164,222 | A | | 12/2000 | Mayerle et al. | |
| 6,192,813 | B1 | * | 2/2001 | Memory et al. | 111/176 |
| 6,308,646 | B1 | * | 10/2001 | Luxon | 111/175 |

FOREIGN PATENT DOCUMENTS

EP 0536543 A1 * 4/1993

OTHER PUBLICATIONS

Pending Patent Application for "Tuning Orifice for Pneumatic Metering Manifold", Ser. No. 09/528,691, Filed Mar. 20, 2000.

* cited by examiner

Primary Examiner—Robert E. Pezzuto
Assistant Examiner—Nathan Mammen
(74) Attorney, Agent, or Firm—Polit & Erickson, LLC

(57) ABSTRACT

A pressure control system is configured to precisely tune positive air pressure or vacuum to pneumatic seed meters that are located along a pneumatic metering manifold. The system includes pressure control valves pneumatically located at plural seed meters that adjust the air pressure or vacuum at the seed meters. The system can utilize feedback pressure signals from pressure sensors at each meter to equalize positive air pressure or vacuum at the seed meters to ensure consistent row-to-row seed populations.

26 Claims, 6 Drawing Sheets

ELECTRONICALLY CONTROLLED TUNING ORIFICE FOR SEED METER TUNING

TECHNICAL FIELD OF THE INVENTION

The present invention is directed to vacuum or positive pressure seed meters for a seeding machine. Particularly, the invention is directed to controlling the air pressure applied to seed meters of a seeding machine.

BACKGROUND OF THE INVENTION

Modern seeding machines use plural seed meters spaced apart along a pneumatic manifold corresponding to planting rows. One such seed meter is disclosed, for example, in U.S. Pat. No. 5,170,909 assigned to the assignee of the present invention. Sophisticated seed metering systems for controlling the rate at which seeds are planted use air pressure to control the application of seed to the ground. In some systems, positive air pressure is used. In other systems, negative air pressure in the form of a vacuum is used to meter the seed.

Positive or negative air pressure is generated by an air pump in the form of a fan. This air pressure from the air pump is directed to a pneumatic manifold. The pneumatic manifold in turn is pneumatically coupled to individual seed meters by hoses.

The air pressure supplied to different row seed meters is not identical. Such a condition results in uneven seed meter performance, possibly resulting in variations in row-to-row seed population and/or seed spacing along the rows. The positive or negative air pressure is highest at those seed meters pneumatically closest to the source of pressurized air or vacuum.

The present inventors have recognized the desirability of proving an air pressure seed metering system that compensates for variations in air pressure along the pneumatic manifold to ensure a consistent row-to-row seed population and seed spacing along each row.

SUMMARY OF THE INVENTION

The present invention provides a pressure control system that is configured to precisely tune positive air pressure or vacuum to pneumatic seed meters that are located along a pneumatic metering manifold.

The system includes pressure control valves pneumatically located at plural seed meters that adjust the air pressure or vacuum at the seed meters. The system can utilize feedback pressure signals from pressure sensors at each meter to equalize positive air pressure or vacuum at the seed meters to ensure consistent row-to-row seed populations. Alternatively, the system could utilize seed population measurement as a feedback signal to adjust control valves.

A seeding machine is provided with a frame having a plurality of pneumatic seed meters. An air pump located on the frame supplies air pressure, positive or negative, depending on the seed meter type, to a pneumatic manifold. The pneumatic manifold in turn is pneumatically coupled to the seed meters by air hoses. Control valves, such as adjustable orifice valves, are pneumatically positioned between the pneumatic manifold and each air connection of the seed meters.

The pneumatic manifold is provided with radially extending tube stubs that are coupled to air hoses. The controllable pneumatic orifices can be connected to the tube stubs, can be connected at a point along the air hose, or can be connected to the seed meter.

The adjustable orifice valve of the invention comprises a substantially enclosed housing having a first air connection and a second air connection with a flow pathway therebetween. One or more baffles are arranged within the housing in the pathway between the air connections. An actuator is mounted to the housing and is operable to position the baffle to a controllable degree between the first and second air connections, to restrict flow through the orifice valve. In one embodiment three baffles are used to form an iris which can increase or decrease the orifice opening between the air connections while maintaining orifice concentricity. In another embodiment a single baffle can be used to close off the orifice in the pathway between the air connections in an eccentric manner.

As an alternative to the separate enclosed housing, the control valve of the invention could be incorporated into the seed meter housing/manifold.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

Figure 1:
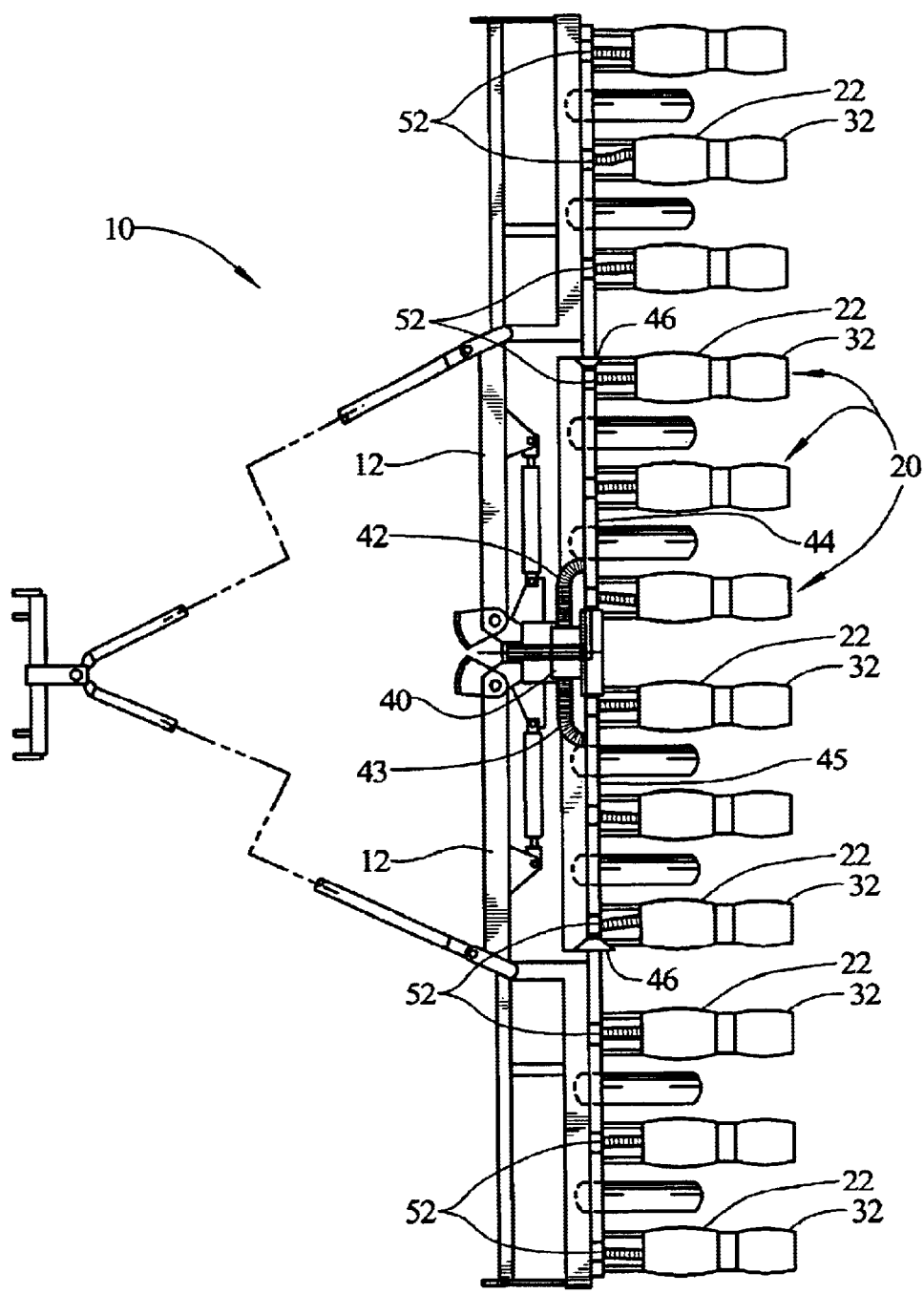
FIG. 1 is a top view of a row crops planter having a plurality of individual planting units.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 is a top view of a seeding machine 10. In the illustrated embodiment, the seeding machine is a row crop planter, however, the present invention could be used on other seeding machines having pneumatic seed meters, including grain drills and air seeders. The planter comprises a frame 12 that can be extended into a working configuration illustrated in FIG. 1 and folded into a transport configuration. A plurality of row crop planting units 20 is mounted to the frame 12.

An air pump 40 in the form of a fan creates an air pressure in two air tubes 42 and 43. The air tube 42 extends between the air pump 40 and the pneumatic manifold 44. The air tube 43 extends between the air pump 40 and the pneumatic manifold 45. Each of the pneumatic manifolds 44 and 45 comprises a cylindrical tube that extends along the frame 12. Each of the pneumatic manifolds 44 and 45 comprises two sections that are coupled together by a flapper coupling 46. The flapper coupling 46 allows each of the manifolds to be split apart as the planter frame 12 is being folded and to be rejoined when the planter frame is unfolded into its working configuration.

Figure 2:
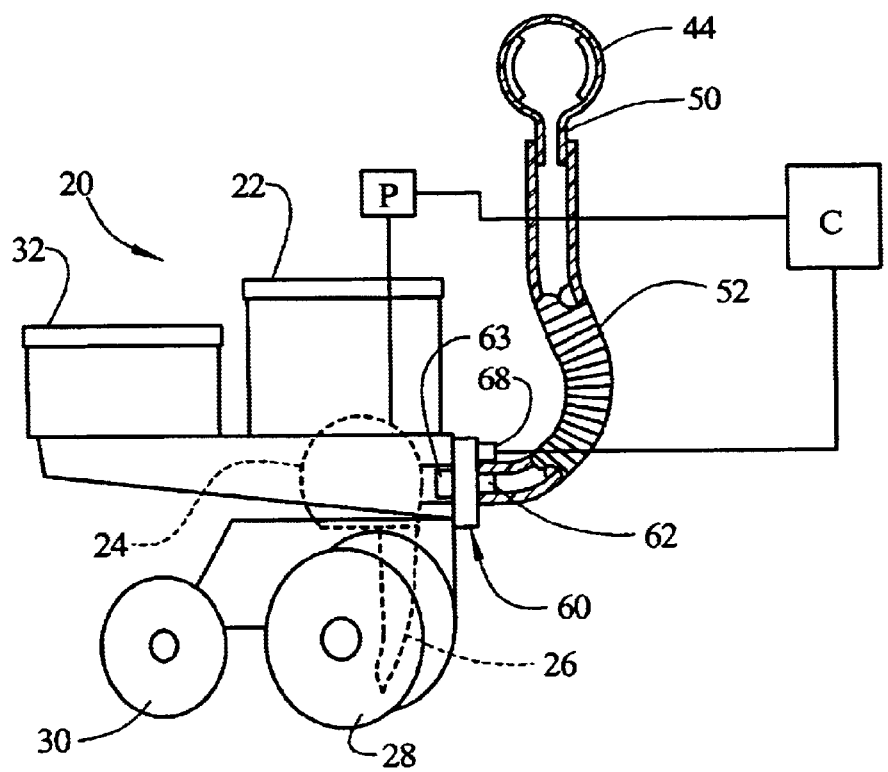
FIG. 2 is a semi-schematic side view of one planting unit and the pneumatic distribution system.
Figure 3:
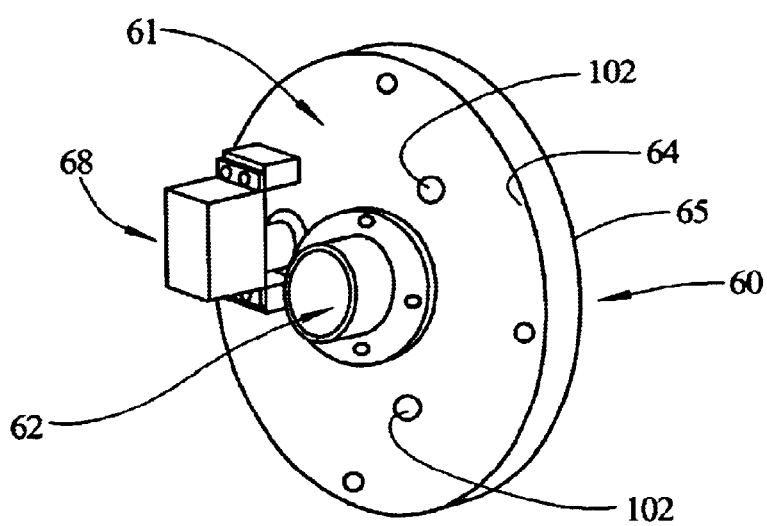
FIG. 3 is a perspective view of an adjustable orifice valve of the present invention.

FIG. 2 illustrates each of the row crop planting units 20 is provided with a seed hopper 22 that directs seed to a seed meter 24 which meters the seed. The metered seed is directed by a seed tube 26 from the seed meter 24 to a planting furrow formed in the ground by furrow opener 28. A planting furrow is closed by angled closing wheels 30. The planting unit may also be provided with a pesticide hopper 32 for carrying pesticides to be applied during the planting process.

The seed meter 24, in the illustrated embodiment, is a vacuum meter of the type presently marketed by the assignee of the present application. A vacuum seed meter is disclosed for example in U.S. Pat. No. 5,170,909 herein incorporated by reference. Negative air pressure is used to attract seeds to a seeding disc as it passes through a seed pile or puddle. The seeds remain in contact with the disc until the vacuum is removed and the seeds fall into the seed tube 26.

The present invention could also be used with positive pressure systems, wherein a positive air pressure is used to drive the seeds to a seed disc as it revolves through a seed puddle. Removing the positive air pressure releases the seeds from the disc and the released seeds then drop into the seed tube 26.

Each of the pneumatic manifolds 44 and 45 are provided with radially extending tube stubs 50 which are coupled to air hoses 52 for directing the air pressure in the pneumatic manifold to the individual seed meters 24.

A pressure control valve in the form of an adjustable orifice valve 60 is positioned between the pneumatic manifolds 44 and 45 and an air connection of the row crop planting unit 23. Each orifice valve 60 comprises a housing 61 having a first air connection in the form of a tube 62 and a second air connection in the form of a tube 63. The housing 61 includes a front cover 64 fastened to a back plate 65. The tube 62 is fastened to the front cover 64. The tube 63 is fastened to the back plate 65. Within the housing 61, one or more baffle plates are arranged as described below.

The first tube 62 is in registry with the second tube 63. The baffle plate or plates are disposed between the first and second tubes 62, 63 to provide an adjustable restriction of airflow between the first and second tubes. An actuator 68 is mounted by fasteners 69 (shown in FIG. 7) onto the cover 64 of the housing 61. The actuator 68 includes an output shaft 68a (shown for example in FIG. 7) which penetrates the housing front cover 64 and which engages one of the baffles. The actuator, depending on an input signal thereto, controls the degree of restriction caused by the baffle or baffles by controllably rotating the baffle or baffles. The actuator is preferably a servomotor, wherein the servomotor can be controlled for precise rotation.

Since the vacuum pressure is related to the flow rate, and flow rate will change as the flow area changes, changing the baffle location will change the vacuum pressure.

Figure 9:
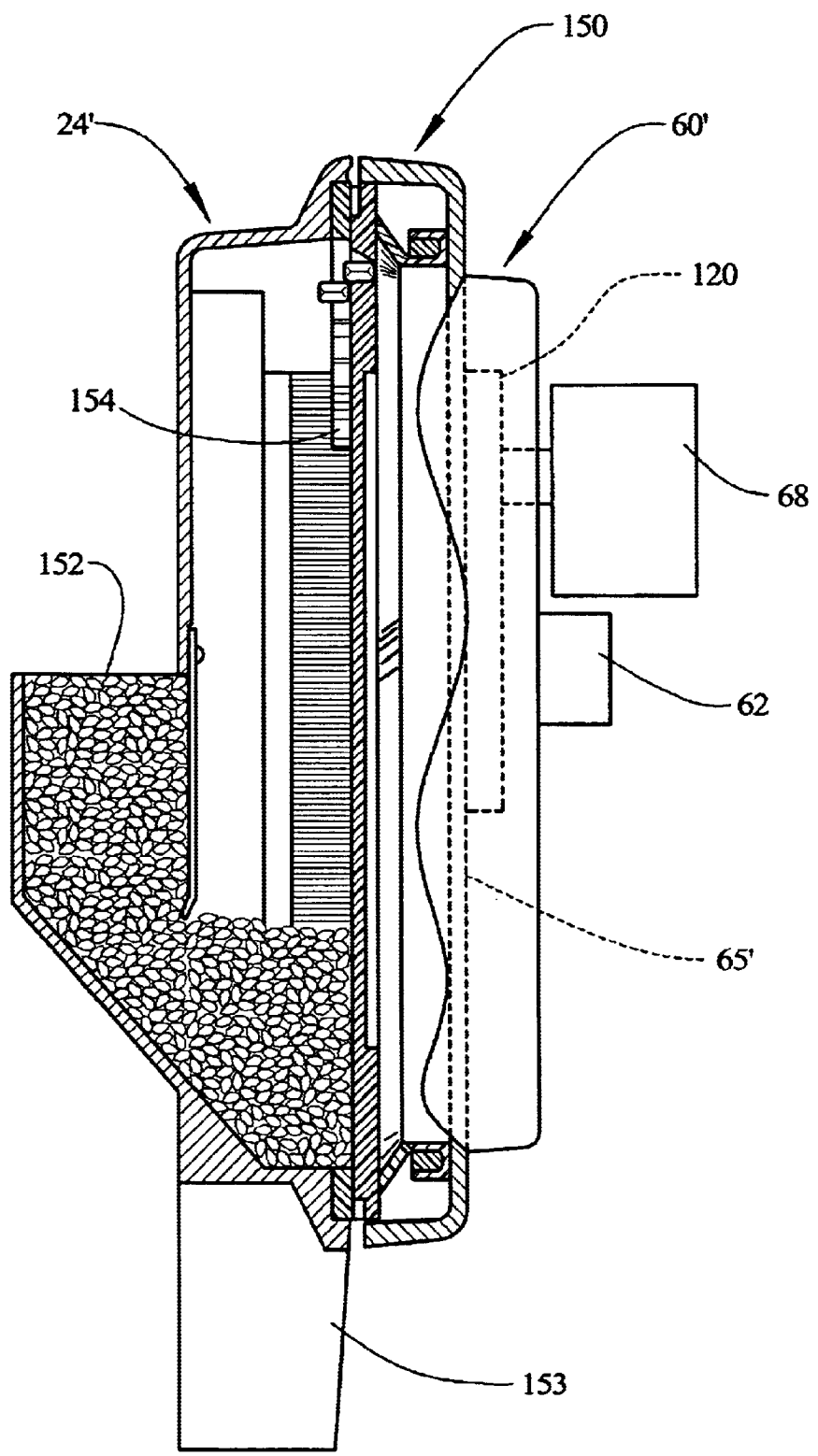
FIG. 9 is a schematic, partially sectional view of an alternate embodiment of the invention.

In the preferred embodiment, the orifice valve 60 is inserted adjacent to, or as part of the meter 24 (see FIG. 9). However, other locations for the orifice valves are possible, such as along the air hose 52, or at the respective manifold 44, 45.

Preferably, an orifice valve 60 would be located at each of the seed meters 24. However, orifice valves 60 could be located only at the seed meters 24 closest to the air tubes 42, 43 to restrict the airflow there to more closely match the air pressure to the air pressure at the remaining seed meters 24 farther from the air tubes 42, 43.

Vacuum pressure can be constantly monitored by pressure sensors P for each row or group of rows. Each sensor can be signal connected to a respective valve 60 to control by feedback the position of the valve and the level of vacuum or positive pressure at the seed meter. Alternately, a controller C, such as a microprocessor, can be signal-connected to all the pressure sensors P. The controller can be signal-connected to the actuators 68 at the orifice valves 60. The vacuum or positive pressure level at each row is adjusted by the controller C according to feedback from the sensors P and by signal communication to each actuator 68. For example, where the actuator is a servomotor, the controller, through an appropriate input/output device, can command the servomotor to open the iris slightly by a limited rotation of the servomotor, to increase the vacuum or positive pressure at the particular seed meter 24, ensuring equal performance of all of the seed meters.

As an alternate feedback, an optical sensor could be located at each seed meter to detect the number of seeds the meter releases to the ground. Typically, the optical sensor is an infrared light emitting diode (LED) that is used in conjunction with a photocell. The photocell emits a pulse each time the light level from the LED goes below a specified threshold. These pulses correspond to seeds. With this information, and the vehicle travel speed, the rate of seed dispensing at each meter can be sensed and the vacuum at each meter adjusted accordingly by the valve.

Although orifice valves 60 are utilized in the above-described embodiment, other types of control valves, such as butterfly valves, could be used in place of orifice valves, and are also encompassed by the invention.

Figure 4:
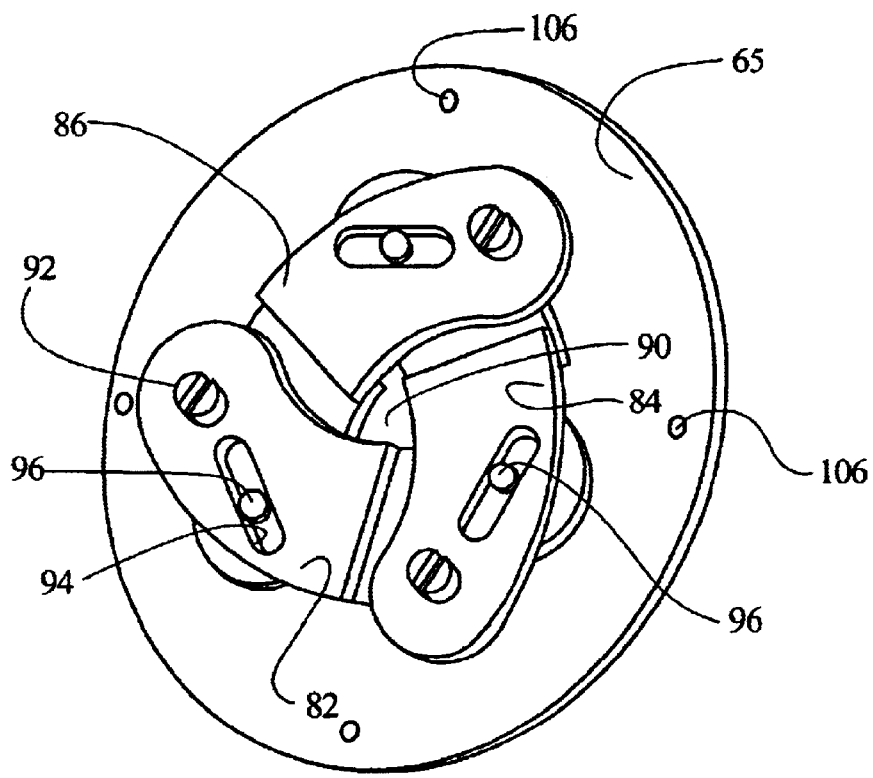
FIG. 4 is a perspective view of the adjustable orifice valve of FIG. 3 with a front cover removed for clarity.
Figure 7:
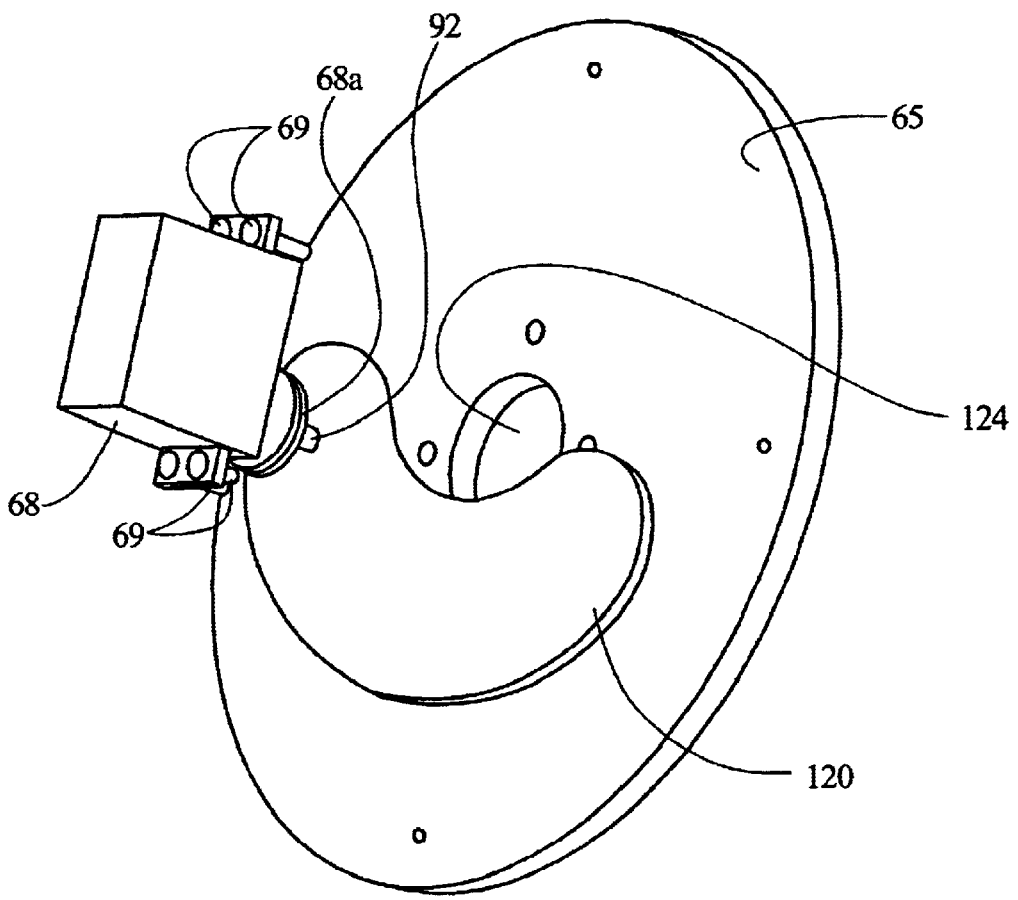
FIG. 7 is a perspective view of an adjustable orifice valve according to a second embodiment of the invention with a front cover removed for clarity, but with an actuator shown in position nonetheless.

FIG. 4 illustrates three baffles 82, 84, 86 that are inter-engaged to form an iris shaped orifice 90 at a center thereof. Each baffle includes a slotted pivot 92, a cam slot 94 and a pin 96. Each pin 96 is located to be positioned within a cam slot 94 of an adjacent baffle. Two of the slotted pivots 92 are rotatably received in an opening 102 in the cover 64. One of the pivots 92 is engaged by the actuator shaft 68a (as shown in FIG. 7) of the actuator 68 to be forcibly rotated thereby. Forceful rotation of the pivot 92 causes corresponding mutual rotation of all of the baffles via the pins 96 and cam slots 94, to either constrict or expand the iris opening 90. Therefore, rotation of the actuator shaft which is engaged to one of the pivots 92 will constrict the iris opening 90 when rotated in a first direction, and will expand the iris opening 90 when rotated in a second, opposite direction. The back plate 65 further includes threaded openings 106 for receiving fasteners from the cover 64 to fix the plate 65 to the cover 64 to form the enclosed housing 61.

Figure 5:
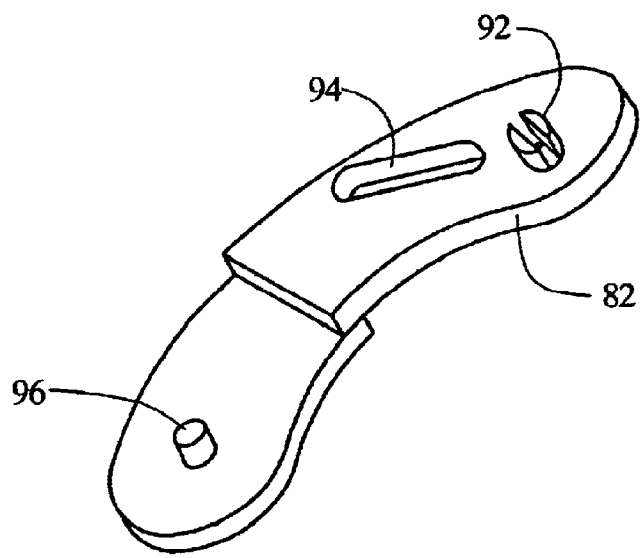
FIG. 5 is a perspective view of one of the baffles shown in FIG. 4

FIG. 5 illustrates a single baffle, such as the baffle 82. The baffle 82 is offset in two planes which allows for the assembly of the three baffles 82, 84, 86 in a relatively flat profile.

Figures 6A, 6B, 6C:
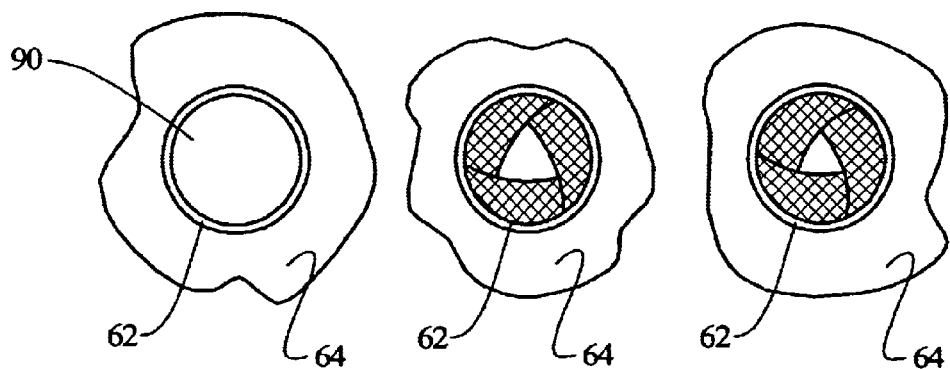
FIGS. 6A–6C are fragmentary plan views of the adjustable orifice of FIG. 3 in progressive stages of closing.

As demonstrated in FIGS. 6A–6C an iris-type baffle arrangement can be used to control the open orifice area 90 to conduct flow between the first tube 62 and the second tube 63. In FIG. 6A, the iris orifice area 90 is completely open allowing full flow between the tubes 62, 63. In FIG. 6B, the iris orifice area 90 is closed to some extent to provide some restriction of flow through the tubes 62, 63. In FIG. 6C, the iris orifice area 90 is further closed to provide an even further increased restriction of flow between the tubes 62, 63.

FIG. 7 illustrates a second embodiment wherein the three baffles 82, 84, 86 of the first embodiment are replaced by a single baffle 120. The single baffle 120 includes a pivot 92 as previously described. The baffle 120 is substantially flat and curved. The single baffle 120 is rotated by the actuator shaft 68a of the actuator 68 in the same manner as in the first embodiment, under control from the controller C as shown in FIG. 2. In this embodiment, an open orifice area 124 is opened and closed to form an eccentric orifice compared to the pathway between the tubes 62, 63.

Figures 8A, 8B, 8C:
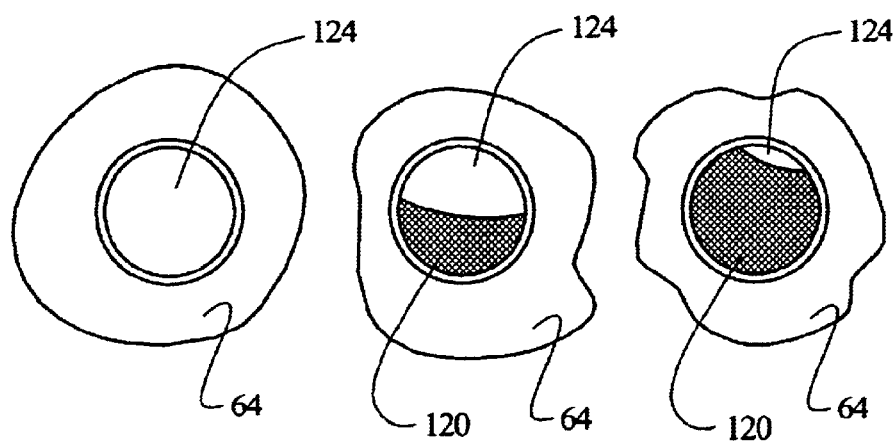
FIGS. 8A–8C are fragmentary plan views of the adjustable orifice of FIG. 7 in progressive stages of closing.

As illustrated in FIGS. 8A–8C, wherein the single baffle 120 is used, upon rotation of the baffle 120, the open orifice area 124 between the tubes 62, 63 is progressively constricted. In FIG. 8A, the baffle 120 completely clears and exposes the pathway between the tubes 62, 63 for a nearly negligible resistance. In FIG. 8B, a somewhat greater resistance is provided by the position of the baffle 120. In FIG. 8C, a further flow resistance is provided by a more constricted opening 124, caused by a further rotation of the baffle 120.

FIG. 9 illustrates an alternate embodiment wherein the valve housing 60' is combined with the seed meter 24' forming one housing 150. The seed meter 24' can be as described in U.S. Pat. No. 5,170,909 herein incorporated by reference. An air assisted seed distribution device, such as a seed disk 154 distributes seed 152. The dist 154 and the valve baffle 120 share the common housing 150. The suction first tube 62 is used but the second tube 64 is not necessary. The single baffle 120 is shown as an example, mounted to an intermediate plate 65'. The iris type baffle plate arrangement of FIG. 4, or another type of control valve could be used in the housing of FIG. 9 as well.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A seeding machine for planting seeds in a field, the seeding machine comprising:
   a frame;
   a plurality of seed meters carried by the frame, each seed meter having an air-assisted seed distribution member comprising a rotating seed disk having perforations for engaging seeds, and a seed meter housing, said air-assisted seed distribution member located within said seed meter housing, said seed meter housing adapted to hold a differential air pressure across the disk;
   an air pump for generating air pressure, said air pump carried by the frame and in pneumatic communication with a pneumatic manifold that is carried by the frame, said pneumatic manifold in pneumatic communication with a plurality of branch lines spaced apart along a length of said manifold;
   each branch line in pneumatic communication between the pneumatic manifold and one seed meter housing; and
   at least one valve located in one of said branch lines, located between the pneumatic manifold and the rotating seed disk of one seed meter, said valve adjustable to balance differential air pressure across rotating seed disks between said one seed meter and at least another one of said seed meters.

2. A seeding machine as defined by claim 1, wherein said valve is located within a branch line of said plurality of branch lines that is pneumatically closest to the air pump.

3. A seeding machine as defined by claim 2, wherein the air pump generates a negative air pressure within the pneumatic manifold.

4. A seeding machine as defined by claim 3, wherein the branch line comprises an air hose.

5. A seeding machine as defined by claim 4, wherein the pneumatic manifold is provided with a radially extending tube stub that is coupled to the air hose.

6. A seeding machine as defined by claim 1, wherein said valve comprises a control valve, and comprising a controller signal-connected to said control valve, said controller configured to maintain a predetermined level of pressure in at least one seed meter of said plurality of seed meters.

7. A seeding machine as defined by claim 1, wherein said valve is integrated with a seed meter housing of said one seed meter.

8. A seeding machine as defined by claim 1, wherein said valve comprises an adjustable orifice.

9. A seeding machine as defined by claim 1, wherein said valve comprises a butterfly valve.

10. A seeding machine as defined by claim 1, wherein said air pump generates a positive pressure in said pneumatic manifold.

11. A seeding machine for planting seeds in a field, the seeding machine comprising:
    a frame;
    a plurality of seed meters carried by the frame;
    an air pump for generating air pressure, said air pump carried by the frame and in pneumatic communication with a pneumatic manifold that is carried by the frame;
    an air hose extending between, and in pneumatic communication with, the pneumatic manifold and at least one of the seed meters; and
    a valve, pneumatically positioned between the pneumatic manifold and an air-assisted seed distribution member within at least one of the seed meters;
    wherein said valve is positioned between the pneumatic manifold and an air connection to a seed meter that is pneumatically closest to the air pump;
    wherein the air pump generates a negative air pressure within the pneumatic manifold;
    wherein the valve is pneumatically positioned between the air hose and the pneumatic manifold; and
    wherein said valve comprises a housing and an actuator mounted to the housing, and at least one baffle carried by the housing, said baffle at least partly defining an adjustable orifice, said baffle moveable by said actuator to change an open flow area of said orifice.

12. A seeding machine as defined by claim 11, wherein said housing includes a first air connection and a second air connection, said first and second air connections being in flow communication, wherein said baffle is disposed between said first and second air connections.

13. A seeding machine as defined by claim 12, wherein the seed meter is part of a row crop-planting unit having a furrow opener and a seed hopper.

14. A seeding machine for planting seeds in a field, the seeding machine comprising:
    a frame;
    a plurality of seed meters carried by the frame, each seed meter having an air-assisted seed distribution member comprising a rotating seed disk having perforations for engaging seeds, and a seed meter housing, said air-assisted seed distribution member located within said seed meter housing, said seed meter housing adapted to hold a differential air pressure across the disk;

an air pump for generating air pressure, said air pump carried by the frame and in pneumatic communication with a pneumatic manifold that is carried by the frame;

a plurality of branch lines, each branch line extending between, and in pneumatic communication with, the pneumatic manifold and a respective one of the seed meters; and at least one control valve, pneumatically positioned within one of the branch lines to one of the seed meters, said control valve located between the pneumatic manifold and the rotating seed disk of the one seed meter, said valve adjustable to balance differential air pressure across rotating seed disks between said one seed meter and at least another one of said seed meters.

15. The seeding machine according to claim 14, wherein said at least one control valve comprises a plurality of control valves, one control valve pneumatically positioned within each branch line to each of the plurality of seed meters.

16. A seeding machine for planting seeds in a field, the seeding machine comprising:

a frame;

a plurality of seed meters carried by the frame;

an air pump for generating air pressure, said air pump carried by the frame and in pneumatic communication with a pneumatic manifold that is carried by the frame;

an air hose extending between, and in pneumatic communication with, the pneumatic manifold and each of the seed meters; and at least one control valve, pneumatically positioned between the pneumatic manifold and an air connection to at least one of the seed meters;

wherein said at least one control valve comprises a control valve pneumatically positioned between the pneumatic manifold and each of the seed meters;

comprising pressure sensors pneumatically located to sense the air pressure in each seed meter, and a controller, said pressure sensors signal-connected to the controller, and said controller signal-connected to the control valves to adjust the pressure drop between the pneumatic manifold and the seed meters according to the pressure sensor signals to equalize pressure at all of the seed meters.

17. The seeding machine according to claim 16, wherein said control valves comprise adjustable orifice valves.

18. The seeding machine according to claim 17, wherein said orifice valves each comprise a housing having an inlet and an outlet, and three interconnected baffles within the housing forming an iris orifice pneumatically between the inlet and outlet, and an actuator connected to one of the baffles and operable by the controller to rotate the baffles to constrict or expand the iris orifice.

19. A seeding machine for planting seeds in a field, the seeding machine comprising:

a frame;

a pneumatic manifold carried by the frame;

an air pump for generating air pressure, said air pump carried by the frame and in pneumatic communication with said pneumatic manifold;

a plurality of seed meters carried by the frame, at least one seed meter having an air-assisted, rotational seed distribution member within said one seed meter, said rotational seed distribution member configured to engage seeds using differential air pressure across said rotational seed distribution member, an air path extending between, and in pneumatic communication with, the pneumatic manifold and said one seed meter, said differential air pressure provided by said air pump via said air path and said one seed meter configured to dispense said seeds by rotational movement of said rotational seed distribution member; and a valve, pneumatically positioned in said air path between the pneumatic manifold and said one seed meter; and wherein said valve comprises a valve housing and an actuator mounted to the valve housing, and at least one baffle carried by the valve housing, said baffle at least partly defining an adjustable orifice, said baffle moveable by said actuator to change an open flow area of said orifice.

20. A seeding machine according to claim 19, wherein said valve housing is integrated with a seed meter housing of said one seed meter.

21. A seeding machine according to claim 19, wherein said valve comprises a control valve, and comprising a controller signal-connected to said control valve, said controller configured to maintain a predetermined level of pressure in at least one seed meter of said plurality of seed meters.

22. A seeding machine according to claim 19, wherein said valve housing has an air inlet and an air outlet and defining a substantially sealed passage between said air inlet and said air outlet; and said actuator has an actuating shaft penetrating said valve housing and engaged to said baffle, said actuator having a signal input to cause said actuator to move said baffle to occlude said passage to a controllable extent.

23. A seeding machine according to claim 22, wherein said actuator comprises a motor and said shaft is rotated.

24. A seeding machine according to claim 23, wherein said baffle comprises a baffle plate having an opening which is progressively in registry with said air inlet as said baffle plate is rotated by said actuator.

25. A seeding machine according to claim 22, wherein said baffle comprises three baffle plates that together define an iris that is openable by said actuator.

26. A seeding machine according to claim 22, wherein said valve housing is integrated with a seed meter housing of said one seed meter.

* * * * *